United States Patent
Xin et al.

(10) Patent No.: US 10,491,445 B2
(45) Date of Patent: Nov. 26, 2019

(54) DATA MODULATION FOR USE IN MULTI-CARRIER SYSTEM, DEMODULATION METHOD, FRAME GENERATION METHOD, AND NODE

(71) Applicant: ZTE CORPORATION, Shenzhen (CN)

(72) Inventors: Yu Xin, Shenzhen (CN); Guanghui Yu, Shenzhen (CN); Jun Xu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/069,350

(22) PCT Filed: Feb. 9, 2017

(86) PCT No.: PCT/CN2017/073168
§ 371 (c)(1),
(2) Date: Jul. 11, 2018

(87) PCT Pub. No.: WO2017/121412
PCT Pub. Date: Jul. 20, 2017

(65) Prior Publication Data
US 2019/0036750 A1     Jan. 31, 2019

(30) Foreign Application Priority Data

Jan. 11, 2016 (CN) .......................... 2016 1 0016772

(51) Int. Cl.
*H04B 7/06* (2006.01)
*H04L 27/26* (2006.01)

(52) U.S. Cl.
CPC ............ *H04L 27/264* (2013.01); *H04L 27/26* (2013.01); *H04L 27/265* (2013.01); *H04L 27/2628* (2013.01); *H04B 7/068* (2013.01)

(58) Field of Classification Search
USPC ......................................... 375/346, 296, 297
See application file for complete search history.

(56) References Cited

U.S. PATENT DOCUMENTS 8,903,012 B2 * 12/2014 Seshadri ............. H04L 27/2003
  329/345
2004/0218689 A1 * 11/2004 Akhtman ............. H04L 27/2624
  375/296

(Continued)

FOREIGN PATENT DOCUMENTS

CN     101321146 A     12/2008
CN     101867547 A     10/2010

(Continued)

OTHER PUBLICATIONS

Zhang, Wanchun et al.,"FB-OFDM: A Novel Multicarrier Scheme for 5G", Jun. 30, 2016, ZTE Technology Journal, vol. 22, No. 3, pp. 1-4.

(Continued)

*Primary Examiner* — Eva Y Puente
(74) *Attorney, Agent, or Firm* — Cantor Colburn LLP

(57) ABSTRACT

Data modulation for use in a multi-carrier system, a demodulation method, a frame generation method, and a node. A transmitter node performs an inverse fast Fourier transform (IFFT) on successive L symbols of frequency domain data, wherein an inverse of an adjacent subcarrier interval of the frequency domain data is T0, and L≥2. The transmitter node modulates, using a designated wave function, the successive L symbols of time domain data generated after the IFFT process, wherein an adjacent symbol interval of the L symbols after the modulation is T1, and T1>T0. A variable interval length of the designated wave function is N×T1, where N is a real number exceeding or equal to 2 or 3. The application also provides the corresponding demodulation method, frame generation method, (Continued)

```
                                    ┌─110
┌──────────────────────────────────────────────┐
│ Inverse Fast Fourier Transform (IFFT) is performed on data in a │
│ frequency domain of L successive symbols. A reciprocal of an     │
│   interval between neighboring subcarriers of the data in the    │
│         frequency domain is T0. L≥2                              │
└──────────────────────────────────────────────┘
                        │
                        ▼
                                    ┌─120
┌──────────────────────────────────────────────┐
│ a sequence of data in a time domain of the L successive symbols │
│ acquired by the IFFT is modulated using a waveform function.    │
│    An interval between the L successive symbols after the        │
│              modulation is T1. T1>T0                             │
└──────────────────────────────────────────────┘
``` and node. The application can better inhibit out-of-band power leakage, and maintain compatibility to LTE. Furthermore, an increased demodulation performance is provided at a receiver end.

20 Claims, 6 Drawing Sheets

(56) References Cited

U.S. PATENT DOCUMENTS

| | | | |
|---|---|---|---|
| 2010/0091919 A1* | 4/2010 | Xu | H04L 1/0025 375/346 |
| 2014/0192925 A1* | 7/2014 | Li | H04L 25/08 375/297 |
| 2014/0321524 A1 | 10/2014 | Kim et al. | |
| 2016/0211998 A1* | 7/2016 | Sun | H04L 27/264 |
| 2017/0331608 A1* | 11/2017 | Luo | H04L 1/0025 |
| 2018/0199341 A1* | 7/2018 | Baldemair | H04L 27/264 |
| 2018/0254936 A1* | 9/2018 | Choi | H04L 27/2614 |

FOREIGN PATENT DOCUMENTS

| | | |
|---|---|---|
| CN | 103326972 A | 9/2013 |
| CN | 103441734 A | 12/2013 |

OTHER PUBLICATIONS

Xin, Yu et al., "FB-OFDM: A Novel Multicarrier Scheme for 5G", Jun. 30, 2016, European Conference on Networks and Communication (EUCNC), pp. 1-6.

Hhi et al., "5G Waveform Candidate Selection: 5GNOW_D3.1_V1.0", 5GNOW Project Consortium, Apr. 30, 2015 (Apr. 30, 2015), 111 pgs.

International Search Report in international application No. PCT/CN2017/073168, dated Apr. 10, 2017, 3 pgs.

English Translation of the Written Opinion of the International Search Authority in international application No. PCT/CN2017/073168, dated Apr. 10, 2017, 7 pgs.

* cited by examiner

DATA MODULATION FOR USE IN MULTI-CARRIER SYSTEM, DEMODULATION METHOD, FRAME GENERATION METHOD, AND NODE

TECHNICAL FIELD

The present disclosure relates to, but is not limited to, field of communication.

BACKGROUND

Long Term Evolution (LTE) relates to wireless cellular communication of Fourth Generation (4G). With LTE, Orthogonal Frequency Division Multiplexing (OFDM) is adopted. A time-frequency resource formed by a subcarrier and an OFDM symbol constitutes a wireless physical time-frequency resource of a LTE system. Existing OFDM has been applied widely in wireless communication. As a cyclic prefix (CP) is adopted. With a CP-OFDM system, an issue caused by a multipath delay may be well dealt with, and a frequency selective channel is divided into a set of parallel flat channels. This well simplifies channel estimation, and leads to a high precision in channel estimation. However, performance of a CP-OFDM system is sensitive to a time offset and a frequency offset between neighboring sub-bands, mainly due to a large spectrum leakage of the system. As a result, inter-sub-band interference may occur. An existing LTE system uses a protecting interval on a frequency domain. However, this lowers a spectral efficiency. Therefore, some new technologies may have to be adopted to suppress out-of-band leakage.

Major companies are starting research on Fifth Generation (5G) wireless communication, with out-of-band leakage suppression as a focus of 5G research. With new multi-carrier solutions according to some recent documents, i.e., Filter Bank Multicarrier (FBMC) and Generalized Frequency Division Multiplexing (GFDM), out-of-band leakage may be suppressed. However, FBMC and GFDM may be incompatible with LTE. Moreover, there may be an issue such as channel estimation, integration with Multiple Input Multiple Output (MIMO), etc. Although Filtered OFDM (F-OFDM) and Universal Filtered Multicarrier (UFMC) technology according to other documents are somewhat compatible with LTE, out-of-band leakage may not be suppressed very well with F-OFDM and UFMC. In addition, in-band subcarriers may still have to be strictly synchronized. That is, the in-band subcarriers may still be sensitive to a time offset and a frequency offset in a sub-band. Moreover, performance of demodulation at a receiving end may somewhat decline.

Therefore, a good solution capable of well suppressing out-of-band leakage while maintaining as much compatibility with an LTE system as possible may have to be proposed.

SUMMARY

Following is an overview of a subject elaborated herein. The overview is not intended to limit a scope of the claims.

According to an embodiment herein, a method for modulating data of a multi-carrier system is implemented at a transmitting node. The method includes:

performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT. An interval between the L successive symbols after the modulation is T1. T1>T0.

A span of a range of an independent variable of the waveform function is N×T1. The N is a real number no less than 2 or 3.

According to an embodiment herein, a method for demodulating data of a multi-carrier system is implemented at a receiving node. The method includes:

receiving data sent by a transmitting node, wherein the data are acquired by modulating, by the transmitting node, a sequence of data in a time domain acquired by Inverse Fast Fourier Transform (IFFT) using a waveform function according to any aforementioned method for modulating data; and demodulating, using the waveform function, the data received.

According to an embodiment herein, a transmitting node of a multi-carrier system includes an Inverse Fast Fourier Transform (IFFT) module and a modulating module.

The IFFT module is arranged for: performing, on data in a frequency domain of L successive symbols, Inverse Fast Fourier Transform (IFFT). A reciprocal of an interval between neighboring subcarriers of the data in the frequency domain is T0. L≥2.

The modulating module is arranged for: modulating, using a waveform function, a sequence of data in a time domain of the L successive symbols acquired by the IFFT. An interval between the L successive symbols after the modulation is T1. T1>T0. A span of a range of an independent variable of the waveform function is N×T1. The N is a real number no less than 2 or 3.

According to an embodiment herein, a receiving node of a multi-carrier system includes a device for demodulating data. The device for demodulating data includes a receiving module and a demodulating module.

The receiving module is arranged for: receiving data sent by a transmitting node. The data are acquired by modulating, by the transmitting node, a sequence of data in a time domain acquired by Inverse Fast Fourier Transform (IFFT) using a waveform function according to any aforementioned method for modulating data.

The demodulating module is arranged for: demodulating the data received using the waveform function.

According to an embodiment herein, a transmitting node of a multi-carrier system includes memory and a processor.

The memory is arranged for saving a program code.

The processor is arranged for reading and executing the program code for:

performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT. An interval between the L successive symbols after the modulation is T1. T1>T0.

A span of a range of an independent variable of the waveform function is N×T1. The N is a real number no less than 2 or 3.

According to an embodiment herein, a receiving node of a multi-carrier system includes memory and a processor.

The memory is arranged for saving a program code.

The processor is arranged for reading and executing the program code for:

receiving data sent by a transmitting node, wherein the data are acquired by modulating, by the transmitting node, a sequence of data in a time domain acquired by Inverse Fast Fourier Transform (IFFT) using a waveform function according to any aforementioned method for modulating data; and demodulating the data received using the waveform function.

According to an embodiment herein, a method for generating a data frame of a multi-carrier system is implemented at a transmitting node, and includes:

performing, on data in a frequency domain of M successive symbols in a data frame, Inverse Fast Fourier Transform (IFFT), a reciprocal of an interval between neighboring subcarriers of the data in the frequency domain being T0, the M being a number of symbols contained in a data frame, M≥2; and modulating, using a waveform function, a sequence of data in a time domain of the M successive symbols acquired by the IFFT. After the modulation, an interval between the M successive symbols is T1. T1>T0. A length of the data frame is (M+N−1)×T1. An interval between the data frame and a neighboring data frame is M×T1 or (M+1)×T1. A length of each symbol in the M symbols is N×T1. The N is a real number no less than 2 or 3.

According to an embodiment herein, a transmitting node of a multi-carrier system includes a device for generating a data frame. The device for generating a data frame includes an IFFT module and a modulating module.

The IFFT module is arranged for: performing, on data in a frequency domain of M successive symbols, Inverse Fast Fourier Transform (IFFT). A reciprocal of an interval between neighboring subcarriers of the data in the frequency domain is T0. The M is a number of symbols contained in a data frame. M≥2.

The modulating module is arranged for: modulating, using a waveform function, a sequence of data in a time domain of the M successive symbols acquired by the IFFT. After the modulation, an interval between the M successive symbols is T1. T1>T0. A length of the data frame is (M+N−1)×T1. An interval between the data frame and a neighboring data frame is M×T1 or (M+1)×T1. A length of each symbol in the M symbols is N×T1. The N is a real number no less than 2 or 3.

According to an embodiment herein, a transmitting node of a multi-carrier system includes memory and a processor.

The memory is arranged for saving a program code.

The processor is arranged for reading and executing the program code for:

performing, on data in a frequency domain of M successive symbols in a data frame, Inverse Fast Fourier Transform (IFFT), a reciprocal of an interval between neighboring subcarriers of the data in the frequency domain being T0, the M being a number of symbols contained in a data frame, M≥2;

modulating, using a waveform function, a sequence of data in a time domain of the M successive symbols acquired by the IFFT. After the modulation, an interval between the M successive symbols is T1. T1>T0. A length of the data frame is (M+N−1)×T1. An interval between the data frame and a neighboring data frame is M×T1 or (M+1)×T1. A length of each symbol in the M symbols is N×T1. The N is a real number no less than 2 or 3.

Compared with an LTE system, with a solution herein, out-of-band leakage is better suppressed while maintaining as much compatibility with LTE as possible. Furthermore, there may be fair demodulation performance at a receiving end.

Any other aspect herein may be understood upon viewing the drawings and the detailed description.

DETAILED DESCRIPTION

The present disclosure is described below with reference to the drawings. Note that embodiments herein and modes thereof may be combined with each other as long as no conflict results from the combination.

As mentioned in the background, a large out-of-band leakage may occur on spectra of an LTE system, necessitating a protecting interval on a frequency domain, which lowers a spectral efficiency. Therefore, some new technologies may have to be adopted to suppress out-of-band leakage. With new multi-carrier solutions according to some recent documents, i.e., FBMC and GFDM, out-of-band leakage may be suppressed. However, FBMC and GFDM may be incompatible with CP-OFDM of LTE. Moreover, there may be an issue such as channel estimation, integration with MIMO, etc. Although F-OFDM and UFMC technology according to other documents are somewhat compatible with CP-OFDM of LTE, out-of-band leakage may not be suppressed very well with F-OFDM and UFMC.

In view of this, an embodiment herein proposes use of a new modulating method for data at a transmitting node of a multi-carrier system. A transmitting end of a multi-carrier system may include a variety of transmitting equipment such as a Base Station (BS, such as an Evolved NodeB, eNB), a terminal (or User Equipment, UE), a relay, a transmitting point, etc. Such transmitting equipment may be collectively referred to herein as a transmitting node. A receiving end of a multi-carrier system may include a variety of receiving equipment such as a BS, UE, a relay, etc. Such receiving equipment may be collectively referred to herein as a receiving node. A receiving node may receive modulated data. The receiving node may demodulate the modulated data received using a waveform function specified beforehand that is identical to that used by a transmitting node. The receiving node may then recover data before modulation by subsequent channel equalization and detection.

Figure 1:
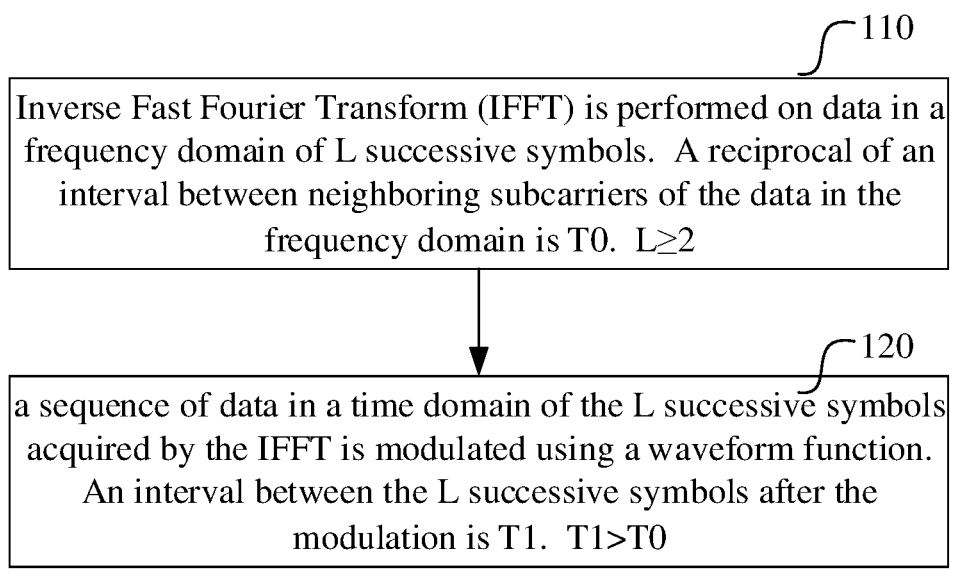
FIG. 1 is a flowchart of a method for modulating data according to an embodiment herein.

According to an embodiment herein, a method for modulating data of a multi-carrier system is implemented at a transmitting node. As shown in FIG. 1, the method includes actions as follows.

In an action 110, Inverse Fast Fourier Transform (IFFT) is performed on data in a frequency domain of L successive symbols. A reciprocal of an interval between neighboring subcarriers of the data in the frequency domain is T0. L≥2.

Modulation may be multi-phase filtering, or may be referred to as multi-phase filtering modulation. Multi-phase filtering may involve multiple filtering processes performed in parallel. Therefore, multi-phase filtering modulating may also be referred to herein as Filter Bank (FB) modulation. A parameter in multi-phase filtering may be determined according to the waveform function specified.

The waveform function may be at least one of: a Root Raised cosine function, a Raised Cosine function, a Piecewise function, or a Rectangular function. A Raised Cosine function may be a function of a Raised Cosine function on the frequency domain that is Fourier Transformed onto a time domain. A Raised Cosine function may be one on the time domain. The same is true for a Root Raised cosine function. A Piecewise function may refer to a function expressed as a combination of non-zero values in different ranges of an independent variable using multiple mathematical expressions, such as a step function having multiple non-zero platform values.

A length of the waveform function in the time domain may be expanded by padding the waveform function with 0 values. For example, a waveform function of a length of N×T may be padded with function values 0 on one side of the range of the independent variable, thereby expanding the range of the independent variable to a length of (N+1)×T.

A maximal time span of the independent variable corresponding to a non-zero value of the waveform function may be no less than 2T1 or 3T1. The maximal time span may be a time span spanning values of the independent variable of two endpoints corresponding to non-zero values of the waveform function within the range of the independent variable.

The waveform function may be symmetrical about an axis. The axis may be a midpoint of the range of the independent variable of the waveform function. That is, the values of the waveform function on a section of NT1/2 on the left and on a section of NT1/2 on the right may be symmetrical.

In an action 120, a sequence of data in a time domain of the L successive symbols acquired by the IFFT is modulated using a waveform function (such as a pulse function, as specified). An interval between the L successive symbols (i.e., an interval between neighboring symbols) after the modulation is T1. T1>T0. A span of a range of an independent variable of the waveform function is N×T1. The N is a real number no less than 2 or 3.

The waveform function specified may be one agreed on in a standard/protocol. Alternatively, the waveform function specified may be one configured for a transmitting node by a node. For example, the transmitting node may be UE. Then, a waveform function may be configured for the UE by a BS. The T1=aT0. A range of the a may be [15/14, 2] or [8/7, 2]. This allows subcarriers to be basically Orthogonal (that is, have no interference) to each other even if the subcarriers are unsynchronized.

The sequence of data in the time domain of the L successive symbols acquired by the IFFT may be modulated using the waveform function as follows. Waveform modulation, namely, windowing modulation, may be performed, using a discrete value of the waveform function, respectively on the sequence of data in the time domain of each symbol in the L successive symbols, and then, L sequences of data in the time domain acquired by the windowing modulation may be superposed.

Windowing modulation may be performed, using the discrete value of the waveform function, respectively on the sequence of data in the time domain of the each symbol in the L successive symbols, and then, the L sequences of data in the time domain acquired by the windowing modulation may be superposed, as follows.

In an action 1, a sequence of data in the time domain of a length of N×T1 of the each symbol may be acquired by repeatedly expanding the sequence of data in the time domain of the each symbol with a period of T0.

The sequence of data in the time domain of the each symbol may be repeatedly expanded with the period of T0 as follows. First, multiple repeated expansions may be performed. If the length of a resulting sequence of data in the time domain of the each symbol is not N×T1, then the sequence of data resulting from the multiple repeated expansions may be truncated, added with a cyclic prefix or suffix, etc., such that the length of a resulting sequence of data equals N×T1, thus realizing a non-integer number of repeated expansions.

In an action 2, L sequences of data in the time domain of the length of N×T1 may be acquired by the windowing modulation by performing a dot product of the discrete value of the waveform function and the sequence of data in the time domain of the length of N×T1 of the each symbol.

In an action 3, a sequence of data of the L successive symbols after the modulation may be acquired by successively staggering, on the time domain by the T1, the L sequences of data in the time domain of the length of N×T1 acquired by the windowing modulation, and then superposing the L sequences of data in the time domain of the length of N×T1 acquired by the windowing modulation staggered on the time domain.

Assume that a sequence of data acquired by performing windowing modulation on each symbol has a length of 3T1, with L=3. Then, a sequence of data, acquired by successively staggering, on the time domain by T, the sequences of data of 3 successive symbols after the modulation, and then superposing the sequences of data of the 3 successive symbols after the modulation staggered on the time domain, may be of a length of 5T1.

The waveform function may be a successive function. Then, a discrete value of the waveform function may be acquired by sampling a value of the successive function, such as at an interval between neighboring discrete data in the sequence of data in the time domain of the each symbol. That is to say, a discrete value of the waveform function may refer to a value of the successive function at a value of the independent variable corresponding to the data in the time domain of the each symbol. For example, a sequence of data of a length of N×T1 may be acquired by repeatedly expanding the sequence of data of the each symbol. Assume that an interval between neighboring discrete data in the sequence of data is Ts. A number of K discrete data may be contained in a time period T. Then, K×Ts=T, and N×K×Ts=N×T. Therefore, a number of N×K discrete data may be contained in a time period of a length of N×T. Assume here that N×K is an integer. Assume that a first discrete data is at a time point 0. Then, a second discrete data is at a time point Ts. A third discrete data is at a time point 2 Ts. An (N×K)-th (that is, the last) discrete data is at a time point (N×K−1)Ts. The span of the range of the independent variable of the waveform function may also be N×T. Therefore, discrete values of the waveform function may just be values of the successive waveform function at values of the independent variable 0, Ts, . . . , (N×K−1)Ts.

The waveform function may be a discrete function. Then, a number of discrete values of the waveform function may be identical to a number of discrete data in a sequence of data in the time domain of a length of N×T1 of the each symbol. The discrete function may be acquired by sampling the successive function.

A value of the N and/or the T1 may be agreed on in a standard/protocol. Alternatively, the value of the N and/or the T1 may be configured by a node. Multiple agreed-on values of the T1 may be configured by a node. For example, the transmitting node may be UE. Then, a value of the T1 may be configured by a BS and then issued to the UE.

The L successive symbols may be symbols on a resource block or on a sub-frame in a multi-carrier system. Alternatively, the L successive symbols may be symbols in other resource units.

The data acquired by the IFFT may go through other processing before being modulated.

Having modulated data of L successive symbols using a specified waveform function, a transmitting node may perform Digital-to-analog Conversion (DAC) as well as a subsequent Radio Frequency (RF) operation on modulated data, before transmitting the modulated data from an antenna.

Figure 2:
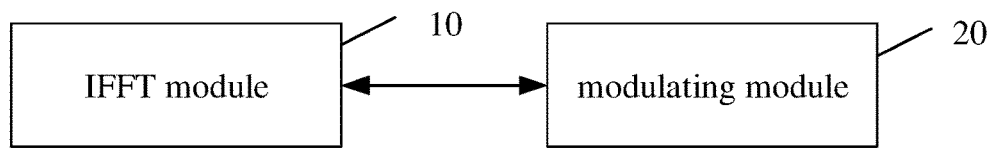
FIG. 2 is a diagram of modules of a transmitting node according to an embodiment herein.

As shown in FIG. 2, a transmitting node of a multi-carrier system according to an embodiment herein includes an Inverse Fast Fourier Transform (IFFT) module 10 and a modulating module 20.

The IFFT module 10 is arranged for: performing, on data in a frequency domain of L successive symbols, Inverse Fast Fourier Transform (IFFT). A reciprocal of an interval between neighboring subcarriers of the data in the frequency domain is T0. L≥2.

The modulating module 20 is arranged for: modulating, using a waveform function, a sequence of data in a time domain of the L successive symbols acquired by the IFFT. An interval between the L successive symbols after the modulation is T1. T1>T0. A span of a range of an independent variable of the waveform function is N×T1. The N is a real number no less than 2 or 3.

The modulation performed by the modulating module may be Filter Bank (FB) modulation.

The waveform function used by the modulating module may be at least one of: a Root Raised cosine function, a Raised Cosine function, a Piecewise function, or a Rectangular function.

A maximal time span of the independent variable corresponding to a non-zero value of the waveform function used by the modulating module may be no less than 2T1 or 3T1.

Optionally, the T1=αT0. A range of the α may be [15/14, 2] or [8/7, 2].

The modulating module may modulate, using the waveform function, the sequence of data in the time domain of the L successive symbols by: respectively performing, using a discrete value of the waveform function, windowing modulation on the sequence of data in the time domain of each symbol in the L successive symbols, and then superposing L sequences of data in the time domain acquired by the windowing modulation.

The modulating module may include an expanding unit, a dot product unit, and a superposing unit.

The expanding unit may be arranged for: acquiring, by repeatedly expanding the sequence of data in the time domain of the each symbol with a period of T0, a sequence of data in the time domain of a length of N×T1 of the each symbol.

The dot product unit may be arranged for: acquiring, by performing a dot product of the discrete value of the waveform function and the sequence of data in the time domain of the length of N×T1 of the each symbol, L sequences of data in the time domain of the length of N×T1 acquired by the windowing modulation.

The superposing unit may be arranged for: acquiring a sequence of data of the L successive symbols after the modulation by successively staggering, on the time domain by the T1, the L sequences of data in the time domain of the length of N×T1 acquired by the windowing modulation, and then superposing the L sequences of data in the time domain of the length of N×T1 acquired by the windowing modulation staggered on the time domain.

The waveform function used by the modulating module may be a successive function. A discrete value of the waveform function may be acquired by sampling a value of the successive function, such as at an interval between neighboring discrete data in the sequence of data in the time domain of the each symbol.

Alternatively, the waveform function used by the modulating module may be a discrete function. A number of discrete values of the waveform function may be identical to a number of discrete data in a sequence of data in the time domain of a length of N×T1 of the each symbol.

The L successive symbols may be symbols on a resource block or a sub-frame in a multi-carrier system.

According to an embodiment herein, a transmitting node of a multi-carrier system includes memory and a processor.

The memory is arranged for saving a program code.

The processor is arranged for reading and executing the program code for:

performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT. An interval between the L successive symbols after the modulation is T1. T1>T0.

A span of a range of an independent variable of the waveform function is N×T1. The N is a real number no less than 2 or 3.

The modulation may be Filter Bank (FB) modulation.

The waveform function may be at least one of: a Root Raised cosine function, a Raised Cosine function, a Piecewise function, or a Rectangular function.

A maximal time span of the independent variable corresponding to a non-zero value of the waveform function may be no less than 2T1 or 3T1.

Optionally, the T1=aT0. A range of the α may be [15/14, 2] or [8/7, 2].

The sequence of data in the time domain of the L successive symbols may be modulated using the waveform function as follows. Windowing modulation may be performed, using a discrete value of the waveform function, respectively on the sequence of data in the time domain of each symbol in the L successive symbols, and then, L sequences of data in the time domain acquired by the windowing modulation may be superposed.

Windowing modulation may be performed, using the discrete value of the waveform function, respectively on the sequence of data in the time domain of the each symbol in the L successive symbols, and then, the L sequences of data in the time domain acquired by the windowing modulation may be superposed, as follows.

A sequence of data in the time domain of a length of N×T1 of the each symbol may be acquired by repeatedly expanding the sequence of data in the time domain of the each symbol with a period of T0.

L sequences of data in the time domain of the length of N×T1 may be acquired by the windowing modulation by performing a dot product of the discrete value of the waveform function and the sequence of data in the time domain of the length of N×T1 of the each symbol.

A sequence of data of the L successive symbols after the modulation may be acquired by successively staggering, on the time domain by the T1, the L sequences of data in the time domain of the length of N×T1 acquired by the windowing modulation, and then superposing the L sequences of data in the time domain of the length of N×T1 acquired by the windowing modulation staggered on the time domain.

The waveform function may be a successive function. Then, a discrete value of the waveform function may be acquired by sampling a value of the successive function, such as at an interval between neighboring discrete data in the sequence of data in the time domain of the each symbol.

The waveform function may be a discrete function. Then, a number of discrete values of the waveform function may be identical to a number of discrete data in a sequence of data in the time domain of a length of N×T1 of the each symbol.

The L successive symbols may be symbols on a resource block or on a sub-frame in a multi-carrier system.

Compared with modulation using a rectangular waveform function of a length of T used in LTE, with a solution herein, modulation using a specified waveform function of a length of N×T1 capable of better suppressing out-of-band leakage is adopted. With a solution herein, IFFT is performed before modulation using a waveform function, which is well compatible with LTE. Although data of neighboring symbols modulated by a waveform function of a length of N×T1 may superpose and interfere with each other, inter-symbol interference may be removed by selecting a proper waveform function. For example, by selecting a Root Raised cosine function, symbols may be made as orthogonal to each other as possible. Moreover, an interval among L symbols modulated by a waveform function may be T1. T1>T0. This may lower interference between neighboring subcarriers on the frequency domain. Therefore, a receiving end may have fair demodulation performance.

Moreover, compared with modulation using a rectangular waveform function of a length of T used in LTE, with a solution herein, modulation using a waveform function specified beforehand of a length of N×T1 is adopted, allowing a narrower main lobe of a subcarrier on the frequency domain. Plus the inter-symbol interval T1 is greater than the length T0 of IFFT, allowing no overlapping between main lobes of neighboring subcarriers, thereby no major interference, allowing unsynchronized neighboring subcarriers. That is to say, a user resource may be scheduled using a minimal unit of a subcarrier, and inter-user synchronization is not a must.

Figure 3:
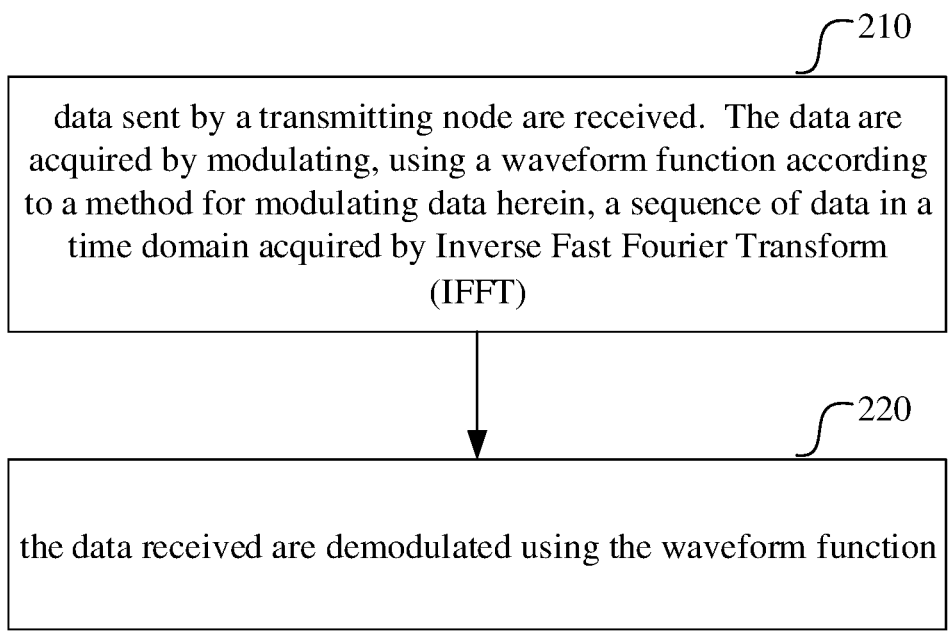
FIG. 3 is a flowchart of a method for modulating data according to an embodiment herein.

According to an embodiment herein, a method for demodulating data of a multi-carrier system is implemented at a receiving node. As shown in FIG. 3, the method includes actions as follows.

In an action 210, data sent by a transmitting node are received. The data are acquired by modulating, using a waveform function according to a method for modulating data herein, a sequence of data in a time domain acquired by Inverse Fast Fourier Transform (IFFT).

In an action 220, the data received are demodulated using the waveform function.

After the data received have been demodulated using the waveform function, the data before the modulation may be recovered by performing channel equalization and detection on data demodulated.

Figure 4:
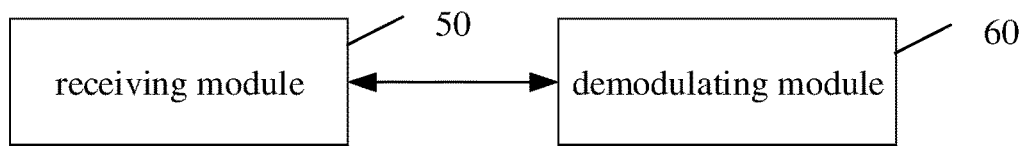
FIG. 4 is a diagram of modules of a receiving node according to an embodiment herein.

According to an embodiment herein, a receiving node of a multi-carrier system includes a device for demodulating data. As shown in FIG. 4, the device for demodulating data includes a receiving module and a demodulating module.

The receiving module 50 is arranged for: receiving data sent by a transmitting node. The data are acquired by modulating a sequence of data in a time domain acquired by Inverse Fast Fourier Transform (IFFT) using a waveform function according to a method for modulating data herein.

The demodulating module 60 is arranged for: demodulating, using the waveform function, the data received.

The receiving node may further include a channel equalization and detection device. The channel equalization and detection device may be arranged for:

recovering the data before the modulation by performing channel equalization and detection on data demodulated.

According to an embodiment herein, a receiving node of a multi-carrier system includes memory and a processor.

The memory is arranged for saving a program code.

The processor is arranged for reading and executing the program code for:

receiving data sent by a transmitting node, wherein the data are acquired by modulating, by the transmitting node, a sequence of data in a time domain acquired by Inverse Fast Fourier Transform (IFFT) using a waveform function according to a method for modulating data herein; and demodulating, using the waveform function, the data received.

The processor may be further arranged for reading and executing the program code for: after the demodulating, using the waveform function, the data received, recovering the data before the modulation by performing channel equalization and detection on data demodulated.

Figure 5:
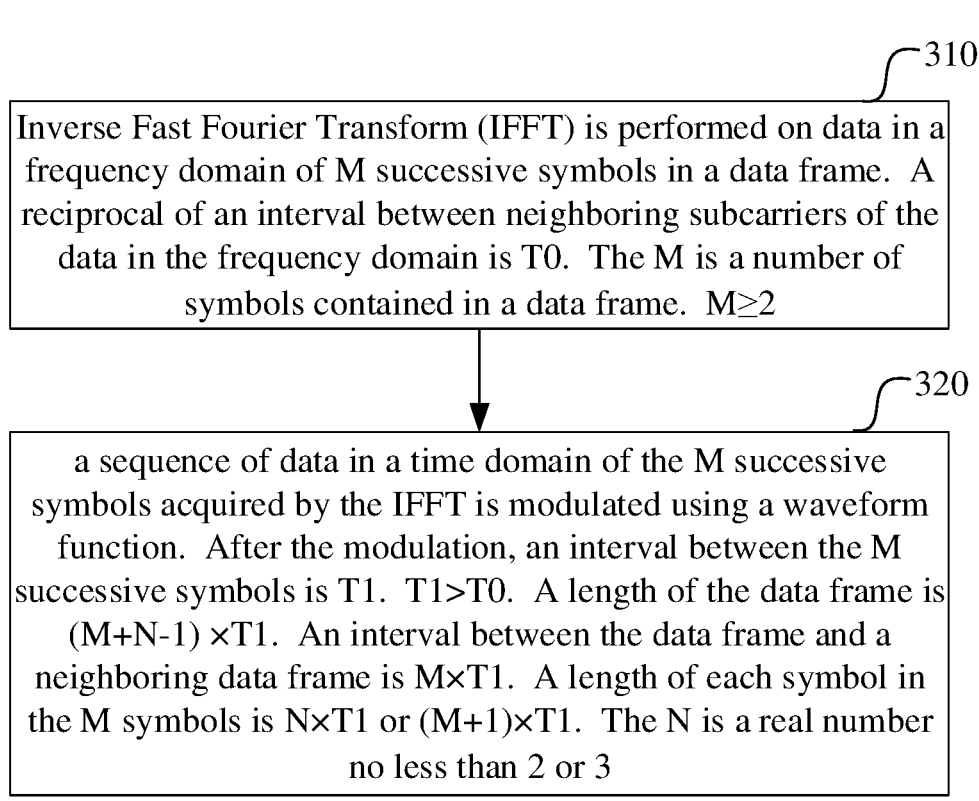
FIG. 5 is a flowchart of a method for generating a data frame according to an embodiment herein.

According to an embodiment herein, a method for generating a data frame of a multi-carrier system is implemented at a transmitting node. As shown in FIG. 5, the method includes actions as follows.

In an action 310, Inverse Fast Fourier Transform (IFFT) is performed on data in a frequency domain of M successive symbols in a data frame. A reciprocal of an interval between neighboring subcarriers of the data in the frequency domain is T0. The M is a number of symbols contained in a data frame. M≥2.

In an action 320, a sequence of data in a time domain of the M successive symbols acquired by the IFFT is modulated using a waveform function. After the modulation, an interval between the M successive symbols is T1. T1>T0. A length of the data frame is (M+N−1)×T1. An interval between the data frame and a neighboring data frame is M×T1 or (M+1)×T1. A length of each symbol in the M symbols is N×T1. The N is a real number no less than 2 or 3.

The sequence of data in the time domain of the M successive symbols acquired by the IFFT may be modulated using the waveform function according to a method for modulating data herein.

Having modulated the data frame using a specified waveform function, a transmitting node may perform DAC as well as a subsequent RF operation on modulated data, before transmitting the modulated data from an antenna.

Figure 6:
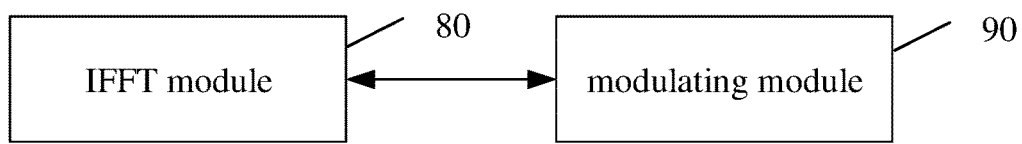
FIG. 6 is a diagram of modules of a device for generating a data frame in a transmitting node according to an embodiment herein.

According to an embodiment herein, a transmitting node of a multi-carrier system includes a device for generating a data frame. As shown in FIG. 6, the device includes an IFFT module and a modulating module.

The IFFT module 80 is arranged for: performing, on data in a frequency domain of M successive symbols, Inverse Fast Fourier Transform (IFFT). A reciprocal of an interval between neighboring subcarriers of the data in the frequency domain is T0. The M is a number of symbols contained in a data frame. M≥2.

The modulating module 90 is arranged for: modulating, using a waveform function, a sequence of data in a time domain of the M successive symbols acquired by the IFFT. After the modulation, an interval between the M successive symbols is T1. T1>T0. A length of the data frame is (M+N−1)×T1. An interval between the data frame and a neighboring data frame is M×T1 or (M+1)×T1. A length of each symbol in the M symbols is N×T1. The N is a real number no less than 2 or 3.

The modulating module may modulate data according to a method for modulating data herein.

According to an embodiment herein, a transmitting node of a multi-carrier system includes memory and a processor.

The memory is arranged for saving a program code.

The processor is arranged for reading and executing the program code for:

performing, on data in a frequency domain of M successive symbols in a data frame, Inverse Fast Fourier Transform (IFFT), a reciprocal of an interval between neighboring subcarriers of the data in the frequency domain being T0, the M being a number of symbols contained in a data frame, M≥2;

modulating, using a waveform function, a sequence of data in a time domain of the M successive symbols acquired by the IFFT. After the modulation, an interval between the M successive symbols is T1. T1>T0. A length of the data frame is (M+N−1)×T1. An interval between the data frame and a neighboring data frame is /M×T1 or (M+1)×T1. A length of each symbol in the M symbols is N×T1. The N is a real number no less than 2 or 3.

The processor may be arranged for reading and executing the program code for: modulating the sequence of data in the time domain of the M successive symbols acquired by the IFFT using the waveform function according to a method for modulating data herein.

Those skilled in the art may understand that all or part of the steps according to an embodiment herein may be implemented by a process of a computer program. The computer program may be stored in a transitory or non-transitory computer-readable storage medium. The computer program may be executed on a hardware platform such as a system, equipment, an apparatus, a device, etc. One step or a combination of steps of a method according to an embodiment herein may be executed.

All or part of the steps according to an embodiment herein may be implemented using an Integrated Circuit. The steps may each be made into an Integrated Circuit module. Multiple modules or steps herein may be implemented by being made into a single Integrated Circuit module.

A device or a functional module/unit herein may be implemented using a universal computing device, and may be integrated in a single computing device or distributed in a network formed by multiple computing devices.

When implemented in form of a software functional module and sold or used as an independent product, a device or a functional module/unit herein may be stored in a transitory or non-transitory computer-readable storage medium. The computer-readable storage medium may be Read Only Memory (ROM), a magnetic disk, a CD, etc.

INDUSTRIAL APPLICABILITY

With a solution herein, out-of-band leakage is better suppressed while maintaining as much compatibility with LTE as possible. Furthermore, there may be fair demodulation performance at a receiving end.

The invention claimed is:

1. A method for modulating data of a multi-carrier system, implemented at a transmitting node, the method comprising:

performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT, an interval between the L successive symbols after the modulation being T1, T1>T0, a span of a range of an independent variable of the waveform function being N×T1, the N being a real number no less than 2.

2. The method of claim 1, wherein the modulation is Filter Bank (FB) modulation.

3. The method of claim 1, wherein the waveform function is at least one of: a Root Raised cosine function, a Raised Cosine function, a Piecewise function, or a Rectangular function.

4. The method of claim 1, wherein a maximal time span of the independent variable corresponding to a non-zero value of the waveform function is no less than 2T1.

5. The method of claim 1, wherein the T1=aT0, wherein a range of the a is [15/14, 2] or [8/7, 2].

6. The method of claim 1, wherein the modulating, using a waveform function, a sequence of data in a time domain of the L successive symbols comprises:

respectively performing, using a discrete value of the waveform function, windowing modulation on the sequence of data in the time domain of each symbol in the L successive symbols, and then superposing L sequences of data in the time domain acquired by the windowing modulation.

7. The method of claim 6, wherein the respectively performing, using a discrete value of the waveform function, windowing modulation on the sequence of data in the time domain of each symbol in the L successive symbols, and then superposing L sequences of data in the time domain acquired by the windowing modulation comprises:

acquiring, by repeatedly expanding the sequence of data in the time domain of the each symbol with a period of T0, a sequence of data in the time domain of a length of N×T1 of the each symbol;

acquiring, by performing a dot product of the discrete value of the waveform function and the sequence of data in the time domain of the length of N×T1 of the each symbol, L sequences of data in the time domain of the length of N×T1 acquired by the windowing modulation; and acquiring a sequence of data of the L successive symbols after the modulation by successively staggering, on the time domain by the T1, the L sequences of data in the time domain of the length of N×T1 acquired by the windowing modulation, and then superposing the L sequences of data in the time domain of the length of N×T1 acquired by the windowing modulation staggered on the time domain.

8. The method of claim 6,
wherein the waveform function is a successive function, wherein the discrete value of the waveform function is acquired by sampling a value of the successive function at an interval between neighboring discrete data in the sequence of data in the time domain of the each symbol, or
wherein the waveform function is a discrete function, wherein a number of the discrete value of the waveform function is identical to a number of discrete data in a sequence of data in the time domain of a length of N×T1 of the each symbol.

9. The method of claim 1, wherein the L successive symbols are on a resource block or a sub-frame in the multi-carrier system.

10. A method for demodulating data of a multi-carrier system, implemented at a receiving node, the method comprising:
receiving data sent by a transmitting node, wherein the data are acquired by the transmitting node by: performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT, an interval between the L successive symbols after the modulation being T1, T1>T0, a span of a range of an independent variable of the waveform function being N×T1, the N being a real number no less than 2; and
demodulating, using the waveform function, the data received.

11. The method of claim 10, further comprising: after the demodulating, using the waveform function, the data received,
recovering the data before the modulation by performing channel equalization and detection on data demodulated.

12. The method of claim 1,
wherein the L successive symbols are M successive symbols in a data frame, the M being a number of symbols contained in a data frame; after the modulation, a length of the data frame being (M+N−1)×T1, an interval between the data frame and a neighboring data frame being M×T1 or (M+1)×T1, a length of each symbol in the M successive symbols being N×T1.

13. A transmitting node of a multi-carrier system, comprising memory and a processor,
wherein the memory is arranged for saving a program code,
wherein the processor is arranged for reading and executing the program code for:
performing, on data in a frequency domain of L successive symbols, Inverse Fast Fourier Transform (IFFT), a reciprocal of an interval between neighboring subcarriers of the data in the frequency domain being T0, L≥2; and
modulating, using a waveform function, a sequence of data in a time domain of the L successive symbols acquired by the IFFT, an interval between the L successive symbols after the modulation being T1, T1>T0, a span of a range of an independent variable of the waveform function being N×T1, the N being a real number no less than 2.

14. The transmitting node of claim 13, wherein the modulating, using a waveform function, a sequence of data in a time domain of the L successive symbols comprises:
respectively performing, using a discrete value of the waveform function, windowing modulation on the sequence of data in the time domain of each symbol in the L successive symbols, and then superposing L sequences of data in the time domain acquired by the windowing modulation.

15. The transmitting node of claim 14, the respectively performing, using a discrete value of the waveform function, windowing modulation on the sequence of data in the time domain of each symbol in the L successive symbols, and then superposing L sequences of data in the time domain acquired by the windowing modulation comprises:
acquiring, by repeatedly expanding the sequence of data in the time domain of the each symbol with a period of T0, a sequence of data in the time domain of a length of N×T1 of the each symbol;
acquiring, by performing a dot product of the discrete value of the waveform function and the sequence of data in the time domain of the length of N×T1 of the each symbol, L sequences of data in the time domain of the length of N×T1 acquired by the windowing modulation; and
acquiring a sequence of data of the L successive symbols after the modulation by successively staggering, on the time domain by the T1, the L sequences of data in the time domain of the length of N×T1 acquired by the windowing modulation, and then superposing the L sequences of data in the time domain of the length of N×T1 acquired by the windowing modulation staggered on the time domain.

16. A receiving node of a multi-carrier system, comprising memory and a processor,
wherein the memory is arranged for saving a program code,
wherein the processor is arranged for reading and executing the program code for:
receiving data sent by a transmitting node, wherein the data are acquired by the transmitting node by: performing, on data in a frequency domain of L successive symbols, Inverse Fast Fourier Transform (IFFT), a reciprocal of an interval between neighboring subcarriers of the data in the frequency domain being T0, L≥2; and modulating, using a waveform function, a sequence of data in a time domain of the L successive symbols acquired by the IFFT, an interval between the L successive symbols after the modulation being T1, T1>T0, a span of a range of an independent variable of the waveform function being N×T1, the N being a real number no less than 2; and
demodulating, using the waveform function, the data received.

17. The receiving node of claim 16, wherein the processor is arranged for reading and executing the program code for: after the demodulating, using the waveform function, the data received,
recovering the data before the modulation by performing channel equalization and detection on data demodulated.

18. The transmitting node of claim 13,
wherein the L successive symbols are M successive symbols in a data frame, the M being a number of symbols contained in a data frame; after the modulation, a length of the data frame being (M+N−1)×T1, an interval between the data frame and a neighboring data frame being M×T1 or (M+1)×T1, a length of each symbol in the M successive symbols being N×T1.

19. The transmitting node of claim 13, wherein the modulation is Filter Bank (FB) modulation.

20. The transmitting node of claim 13, wherein the waveform function is at least one of: a Root Raised cosine function, a Raised Cosine function, a Piecewise function, or a Rectangular function.

* * * * *